(12) United States Patent
Chang

(10) Patent No.: US 8,196,948 B2
(45) Date of Patent: Jun. 12, 2012

(54) ELEVATING DEVICE FOR SEAT CUSHION OF BICYCLE

(76) Inventor: Chi-Tien Chang, Changhua (TW)

(*) Notice: Subject to any disclaimer, the term of this patent is extended or adjusted under 35 U.S.C. 154(b) by 229 days.

(21) Appl. No.: 12/693,424

(22) Filed: Jan. 25, 2010

(65) Prior Publication Data

US 2011/0181082 A1 Jul. 28, 2011

(51) Int. Cl.
*B62K 1/00* (2006.01)
(52) U.S. Cl. .................. 280/281.1; 297/199; 297/344.16
(58) Field of Classification Search ............... 280/281.1, 280/283, 274, 275, 288.4; 297/199, 344.16, 297/215.13
See application file for complete search history.

(56) References Cited

U.S. PATENT DOCUMENTS

| | | | | |
|---|---|---|---|---|
| 3,788,587 A | * | 1/1974 | Stemmler | 248/562 |
| 5,713,555 A | * | 2/1998 | Zurfluh et al. | 248/599 |
| 6,220,581 B1 | * | 4/2001 | Mueller | 267/64.11 |
| 2004/0070168 A1 | * | 4/2004 | McKinnon | 280/281.1 |

* cited by examiner

*Primary Examiner* — Tony Winner

(57) ABSTRACT

An elevating device for seat cushion of bicycle includes a cylinder having at least one level to expand or contract inside a frame tube of a bicycle frame, a stick for operating the cylinder, and a driving device for driving the stick. By the driving device, the stick below the seat cushion will press the cylinder so as to make an adjustment of the height of the seat cushion. Therefore, the elevating operation for seat cushion of bicycle is easy and convenient to adjust a proper height of the seat cushion for getting on/off the bicycle and also for comfortable riding.

8 Claims, 9 Drawing Sheets

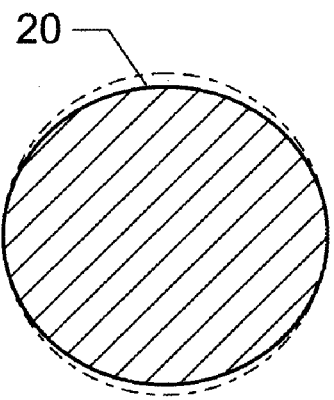
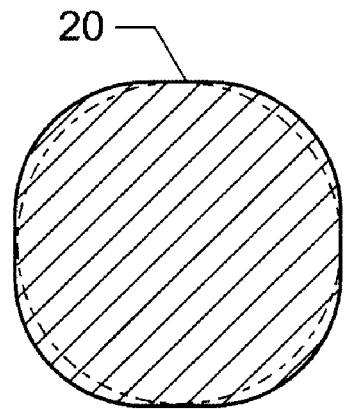
FIG.16　　　　　　　　　FIG.17
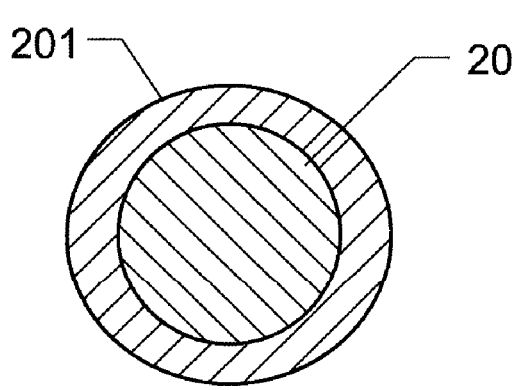
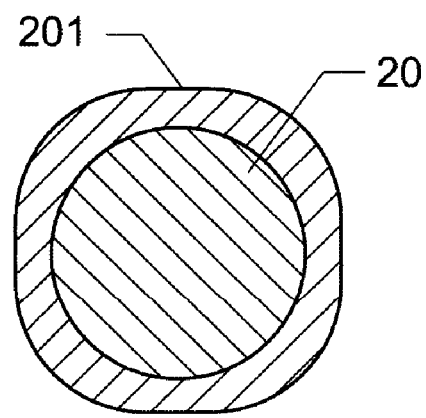
FIG.18　　　　　　　　　FIG.19

ELEVATING DEVICE FOR SEAT CUSHION OF BICYCLE

FIELD OF THE INVENTION

The present invention relates to elevating device, and particular to an elevating device for a seat cushion of a bicycle.

DESCRIPTION OF THE PRIOR ART

Bicycle is an environment-friendly transportation, and riding bicycle is also a good exercise. Height of a bicycle is adjustable through a frame tube and a seat cushion thereof for different user or different riding condition.

The adjustment of the height of bicycle includes conventional tightening screw, oil pressure control, and hydraulic pressure control.

The prior height adjustments have complicated structure. Numerous parts of the prior art also cause high malfunction rate, long manufacturing period, and heavy weight as well as a high cost.

However, the height adjustment has to be done before a rider getting on the bicycle. For normal rider, the height of the seat cushion should allow user's feet touching ground for supporting while stop. But above condition will cause rider's feet couldn't fully stretch for bicycling and will cause fatigue and injury.

Therefore, to make sure the adjustment of seat cushion for riding safety and comfortable is an urgent object.

SUMMARY OF THE PRESENT INVENTION

Accordingly, the primary object of the present invention is to provide an elevating device for seat cushion of bicycle to adjust height of the seat cushion for safely getting on/off the bicycle and for comfortable riding.

BRIEF DESCRIPTION OF THE DRAWINGS

FIG. 16 is a cross section view showing an embodiment of an adjustable rod having a non-circular cross-section.

FIG. 17 is a cross section view showing another embodiment of an adjustable rod having a non-circular cross-section.

FIG. 18 is a cross section view showing an embodiment of an adjustable rod having a circular cross-section.

FIG. 19 is a cross section view showing another embodiment of an adjustable rod having a circular cross-section.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
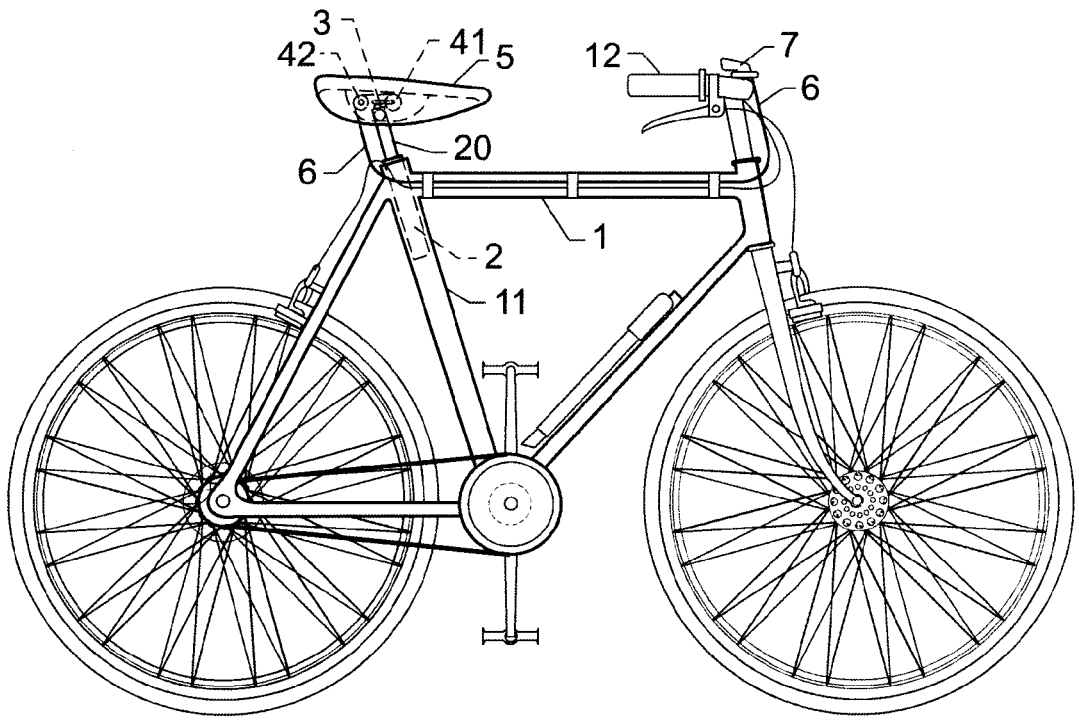
FIG. 1 is a schematic view showing an embodiment of the present invention.
Figure 2:
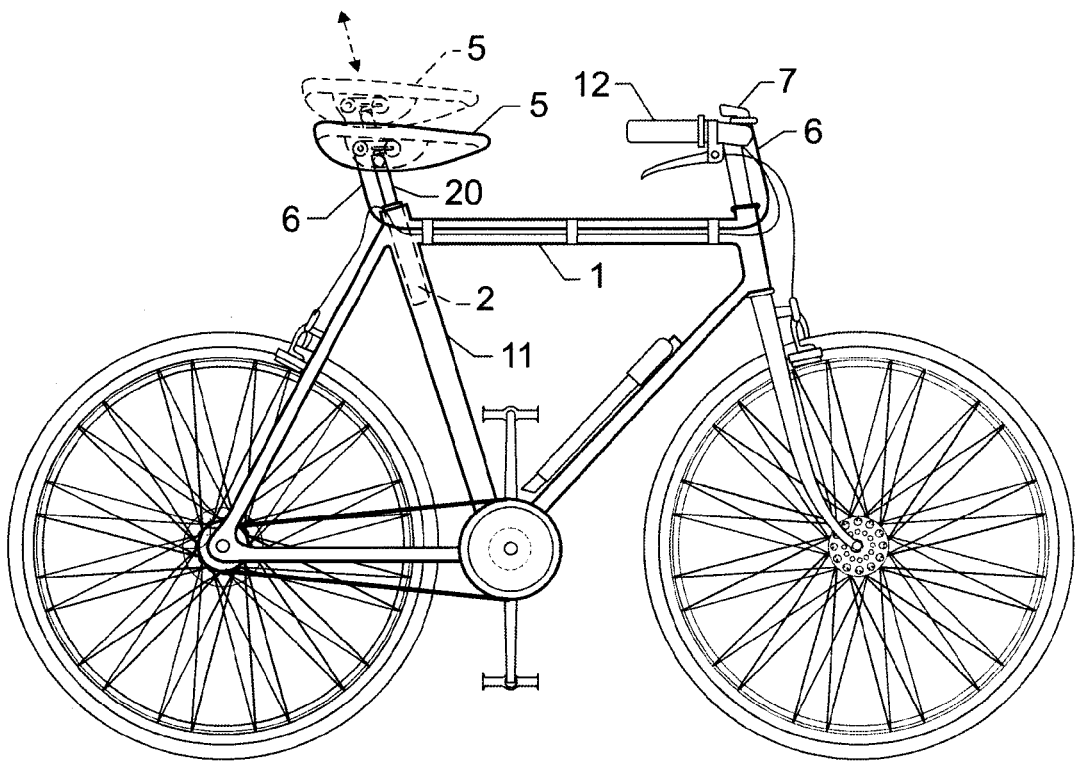
FIG. 2 is a schematic view showing the elevating operation of the present invention.

Referring to FIGS. 1 and 2, an embodiment of an elevating device for seat cushion of bicycle according to the present invention is illustrated. The embodiment includes a bicycle frame 1, a cylinder 2 having at least one level to expand or contract inside a frame tube 11, a stick 3 for operating the cylinder 2, a driving device 4 for driving the stick 3, and a seat cushion 5.

Figure 3:
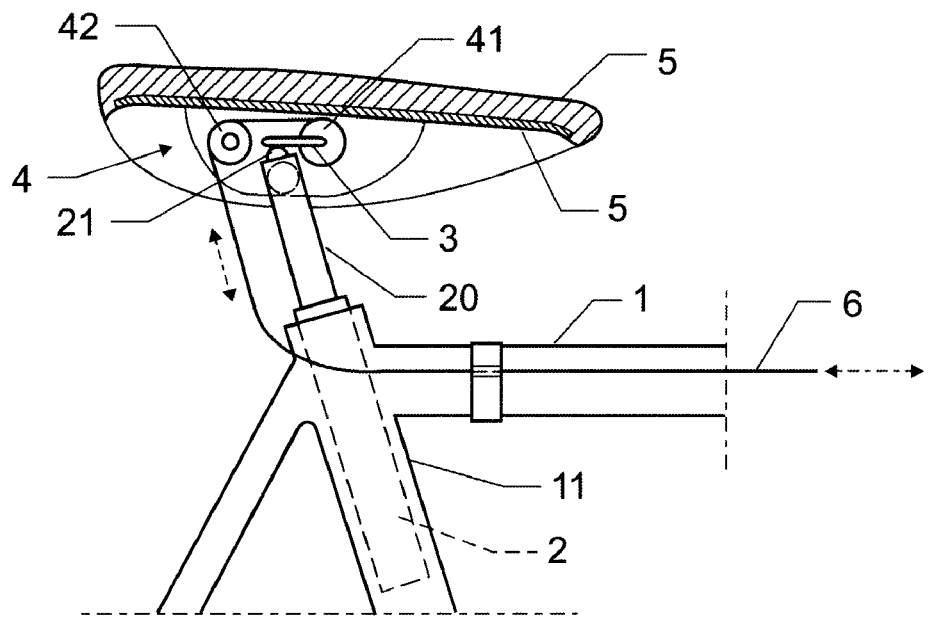
FIG. 3 is a prospective view showing a seat cushion, cylinder, and rope illustrated in FIG. 1.
Figure 4:
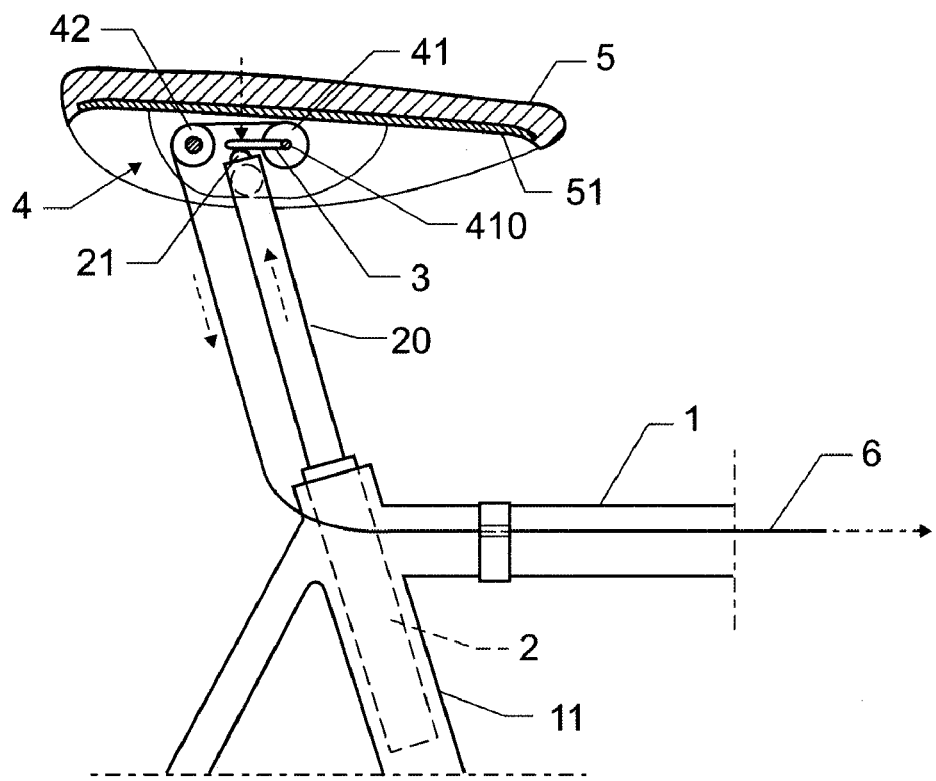
FIG. 4 is a schematic view showing a raising operation of the seat cushion through the cylinder.

Referring to FIGS. 3 and 4, the cylinder 2 is received inside the frame tube 11 of the bicycle frame 1. An adjustable rod 20 of the cylinder 2 is connected to a base 51 arranged to a bottom of the seat cushion 5. The stick 3 is arranged below the base 51 of the seat cushion 5. The stick 3 is linked to the driving device 4. While the driving device 4 is driven, a control key 21 on a top of the cylinder 2 will be pressed by the stick 3 so that the cylinder 2 can be controlled to expand or contract. The driving device includes a roller 41 and a pulley 42. An end of the stick 3 is linked to an axle 410 of the roller 41. A rope 6 fixed to the roller 41 is leaded to a lever 7 arranged to a handle stem 12 or a predetermined position of the bicycle frame 1 through the pulley 42. By the lever 7 pulling the rope 6, the roller 41 will rotate and the stick 3 fixed to the roller 41 to press the control key so as to make an adjustment of the height of the seat cushion 5.

Figure 5:
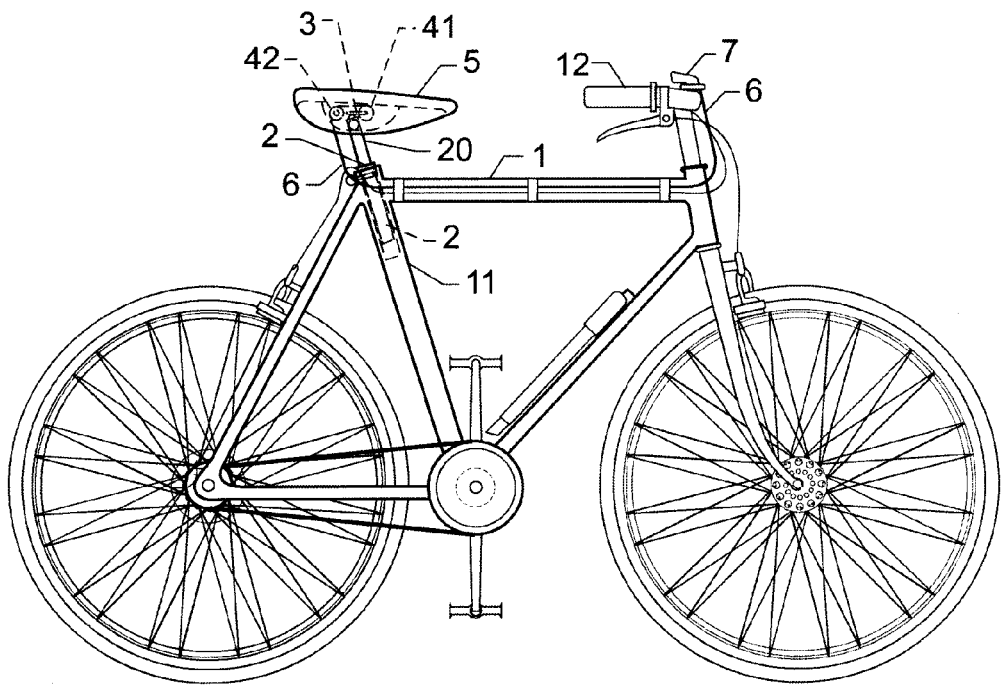
FIG. 5 is another embodiment of the present invention.
Figure 6:
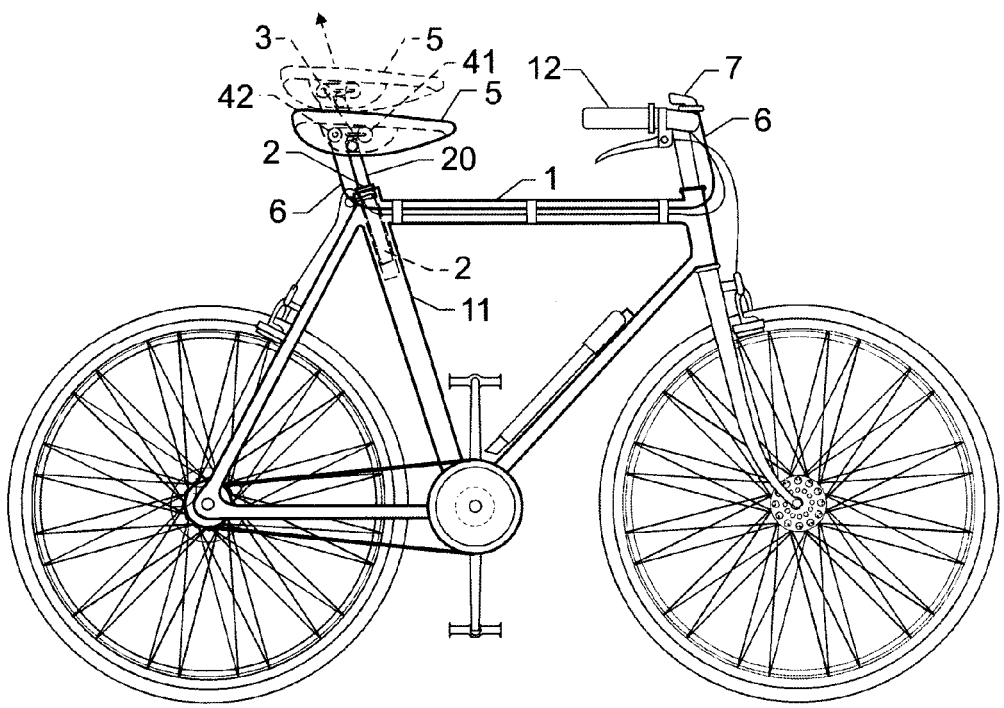
FIG. 6 is a schematic view showing a raising operation of the seat cushion illustrated in FIG. 5.

With reference to FIGS. 5 and 6, another embodiment of the present invention is illustrated. The embodiment includes a frame 1, a tightening screw 110 on an end of a frame tube 11, a cylinder 2 having at least one level to expand or contract inside a frame tube 11, a stick 3 for operating the cylinder 2, a driving device 4 for driving the stick 3, and a seat cushion 5.

Figure 7:
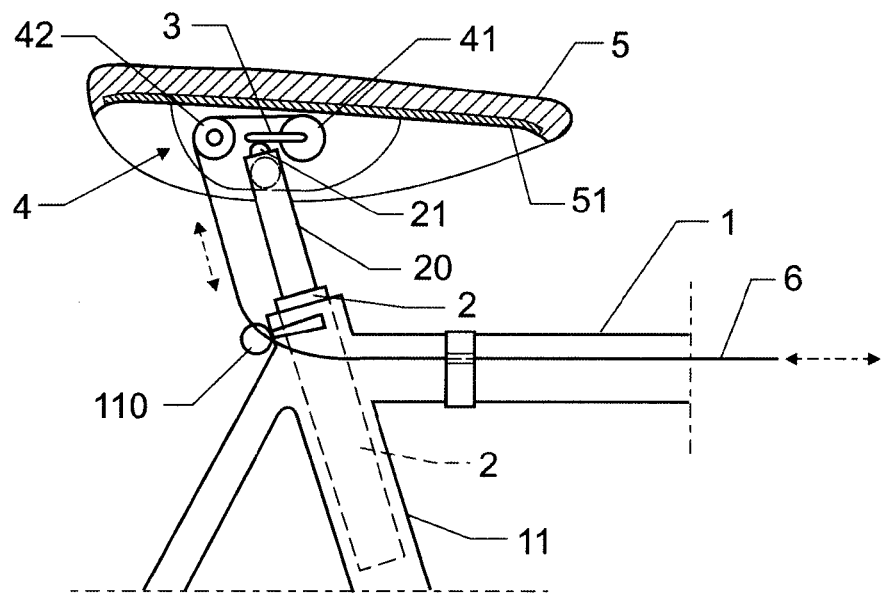
FIG. 7 is a prospective view showing a seat cushion, cylinder, and rope illustrated in FIG. 5.
Figure 8:
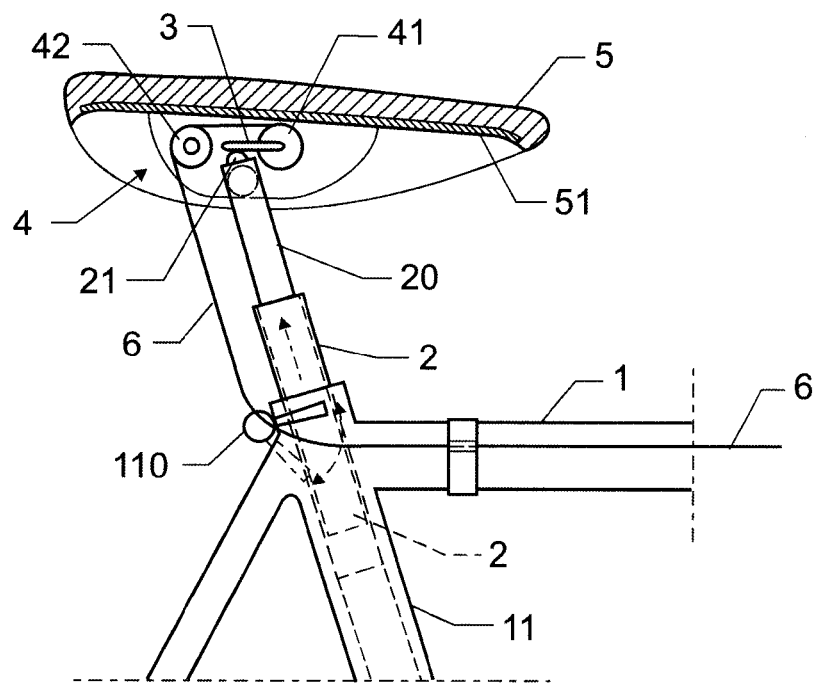
FIG. 8 is a prospective view showing the protruded cylinder is held to a frame tube of a bicycle frame.

Referring to FIGS. 7 and 8, the cylinder 2 is received inside the frame tube 11 of the bicycle frame 1. The cylinder 2 is held to the frame tube 11 by the tightening of the tightening screw 110. An adjustable rod 20 of the cylinder 2 is connected to a base 51 arranged to a bottom of the seat cushion 5. The stick 3 is arranged below the base 51 of the seat cushion 5. The stick 3 is linked to the driving device 4. While the driving device 4 is driven, a control key 21 on a top of the cylinder 2 will be pressed by the stick 3 so that the cylinder 2 can be controlled to expand or contract. The driving device includes a roller 41 and a pulley 42. An end of the stick 3 is linked to an axle 410 of the roller 41. A rope 6 fixed to the roller 41 is leaded to a lever 7 arranged to a handle stem 12 or a predetermined position of the bicycle frame 1 through the pulley 42. By the lever 7 pulling the rope 6, the roller 41 will rotate and the stick 3 fixed to the roller 41 will press the control key so as to make an adjustment of height of the seat cushion 5.

Figure 9:
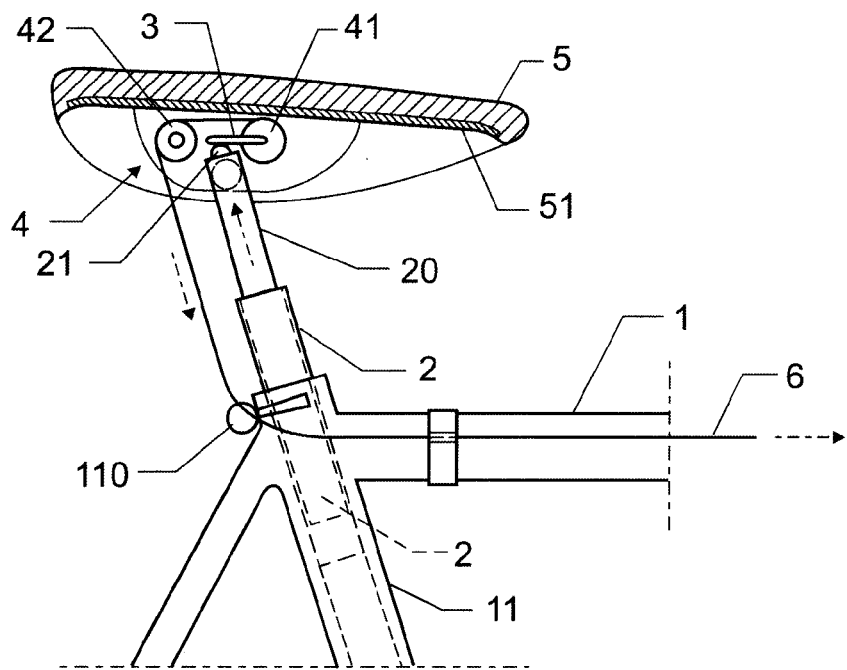
FIG. 9 is a prospective view showing a seat cushion, cylinder, and rope illustrated in FIG. 8.
Figure 10:
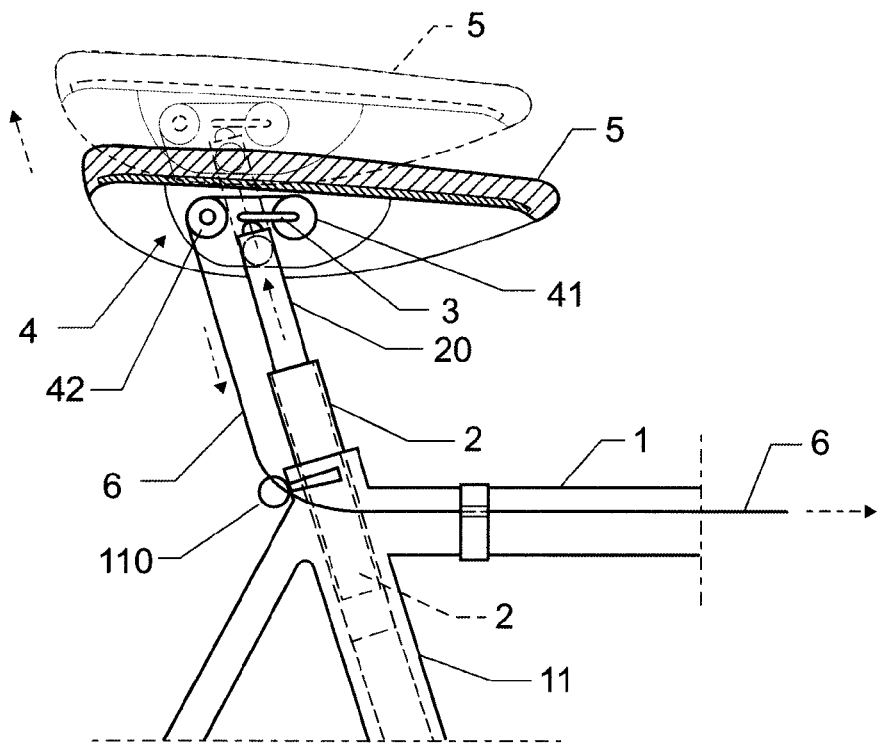
FIG. 10 is another schematic view showing a raising operation of the seat cushion through the cylinder.
Figure 11:
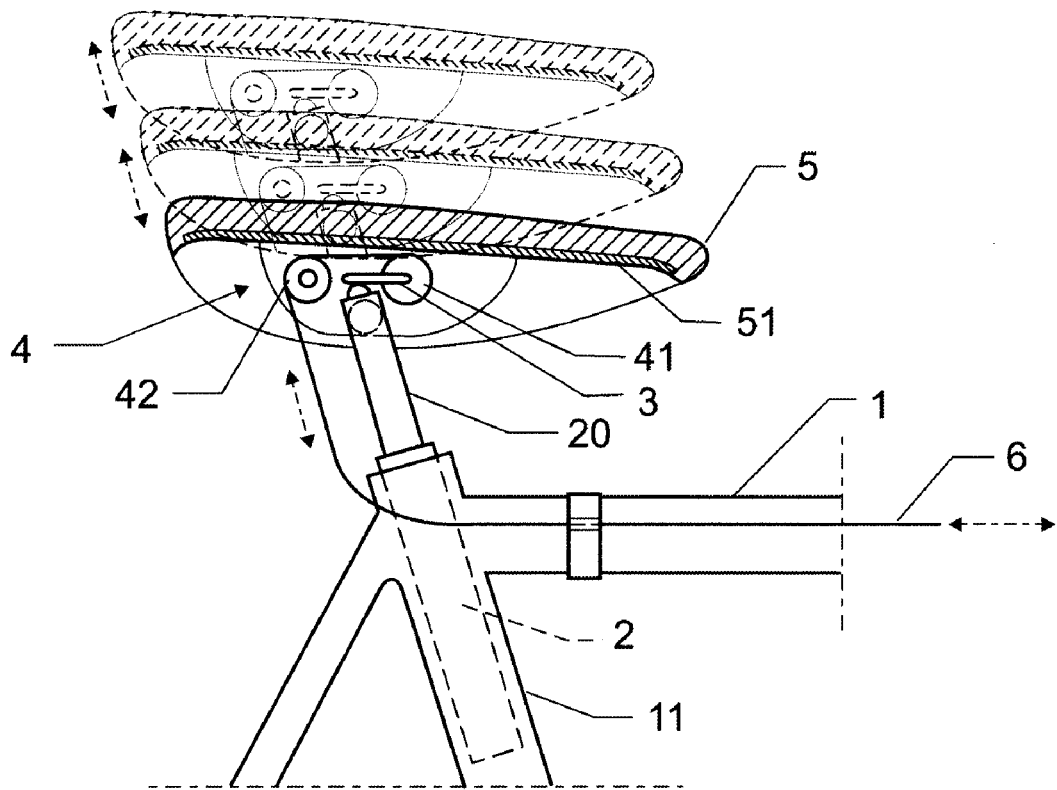
FIG. 11 is a schematic view showing multiple levels elevation of the cylinder.

The cylinder 2 can be entirely received inside the frame tube 11 as shown in FIGS. 1 and 2. Or, the cylinder 2 is slid out from the frame tube 11 for a certain height as shown in FIGS. 9 and 10. Moreover, the cylinder 2 can be adjusted for at least one level of height as shown in FIG. 11.

Figure 12:
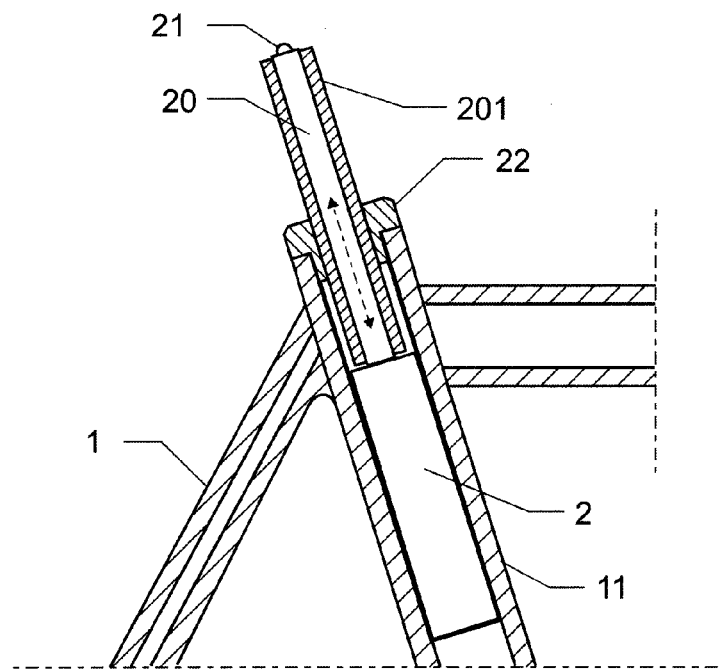
FIG. 12 is a schematic view showing an operation of an adjustable rod illustrated in FIG. 1.
Figure 13:
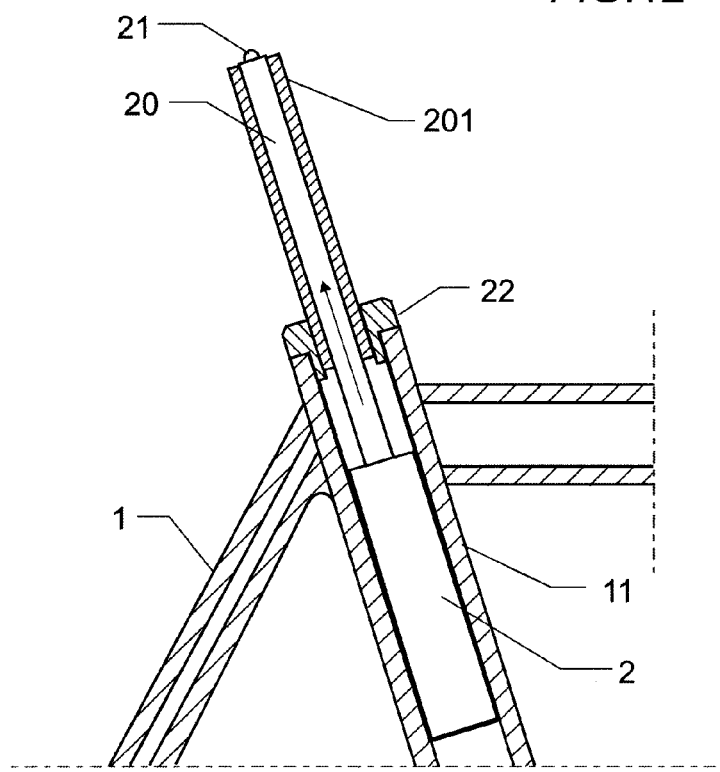
FIG. 13 is another schematic view showing an operation of the adjustable rod illustrated in FIG. 12.

However, a cross-section of the adjustable rod 20 of the embodiment illustrated in FIG. 1 is not circular to avoid rotation of the seat cushion 5 as shown in FIGS. 16 and 17. While the cross-section of the adjustable rod 20 is circular as shown in FIGS. 12 and 13, a cap 22 with a non-circular opening is arranged to an upper end of the frame tube 11. The adjustable rod 20 is covered by a sleeve 201 as shown in FIGS. 18 and 19. The sleeve 201 is fit to the opening of the cap 22 so that the adjustable rod 20 will not rotate while expanding and contracting.

Figure 14:
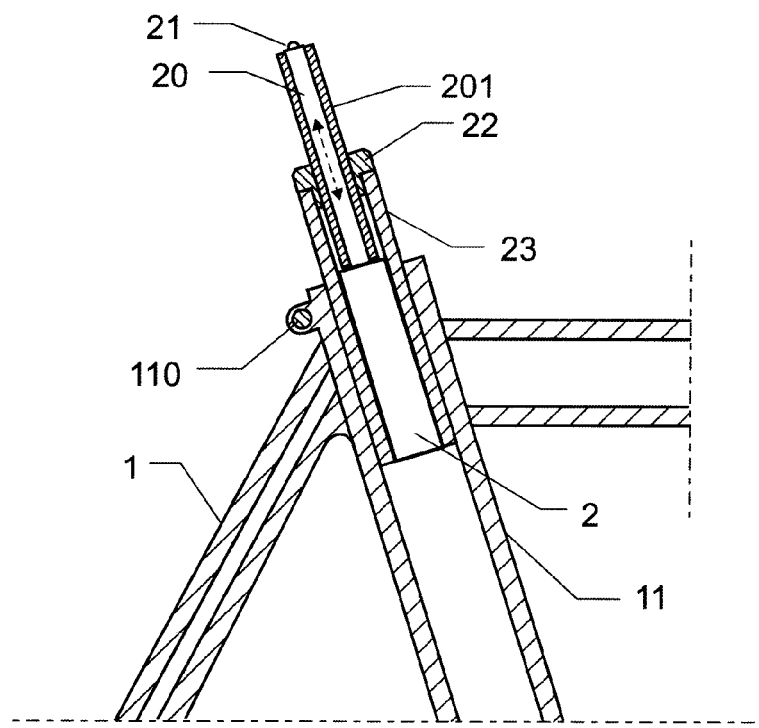
FIG. 14 is a schematic view showing an operation of an adjustable rod illustrated in FIG. 5.
Figure 15:
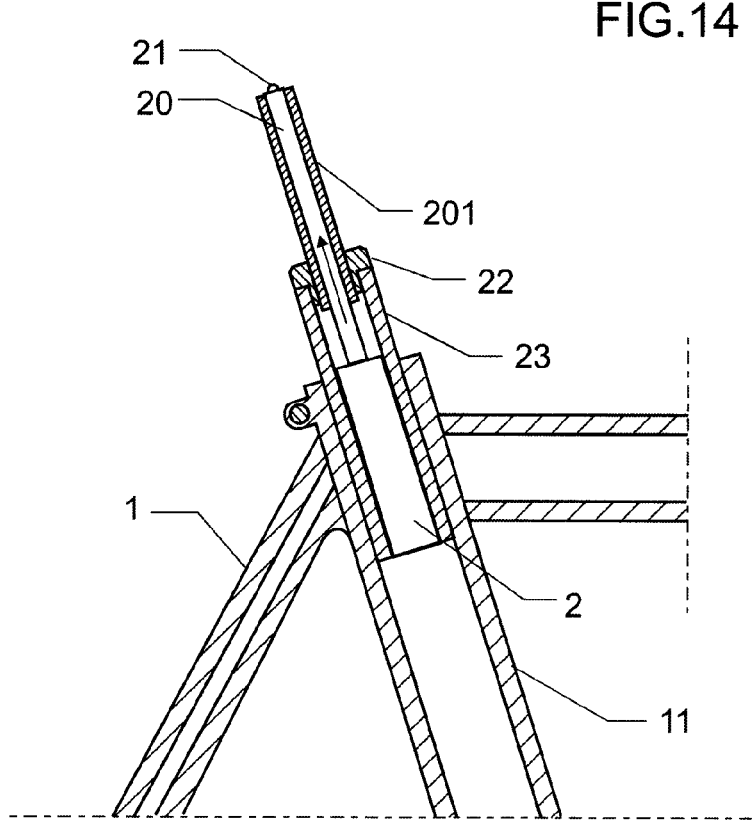
FIG. 15 is another schematic view showing an operation of the adjustable rod illustrated in FIG. 14.

As shown in FIG. 5, the cross-section of the adjustable rod 20 of the embodiment illustrated in FIG. 1 is not circular to avoid rotation of the seat cushion 5 as shown in FIGS. 16 and 17. The cylinder 2 is covered by a sleeve 23 as shown in FIGS. 14 and 15, and the sleeve 23 inside the frame tube 11 is tightened by the tightening screw 110. While the cross-section of the adjustable rod 20 is circular as shown in FIGS. 12 and 13, a cap 22 with a non-circular opening is arranged to an upper end of the sleeve 23. The adjustable rod 20 is covered by a sleeve 201 as shown in FIGS. 18 and 19. The sleeve 201 is fit to the opening of the cap 22 so that the adjustable rod 20 will not rotate while expanding and contracting.

Therefore, the simple elevating device for seat cushion of bicycle according to the present invention is easy and convenient to adjust height of the seat cushion for getting on/off the bicycle and also for comfortable riding.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An elevating device for a seat cushion of a bicycle comprising:
   a cylinder having at least one level which is expandable or contractablele inside a frame tube of a bicycle frame;
   a stick for operating the cylinder;
   a driving device for driving the stick; and
   a seat cushion; and
   wherein an adjustable rod of the cylinder is connected to a base arranged to a bottom of the seat cushion; the stick is arranged below the base of the seat cushion; the stick is linked to the driving device; while the driving device is driven, a control key on a top of the cylinder will be pressed by the stick so that the cylinder is controllable to expand or contract; the driving device includes a roller and a pulley; an end of the stick is linked to an axle of the roller; a rope fixed to the roller is leaded to a lever arranged to a handle stem or a predetermined position of the bicycle frame through the pulley; by the lever pulling the rope, the roller will rotate and the stick fixed to the roller will press the control key so as to adjust a height of the seat cushion.

2. The elevating device as claimed in claim 1, wherein a cap having a non-circular opening is arranged to an upper end of the frame tube.

3. The elevating device as claimed in claim 1, wherein a cross-section of the adjustable rod is circular and the adjustable rod is covered by a non-circular cross-section sleeve.

4. The elevating device as claimed in claim 1, wherein a cross-section of the adjustable rod is non-circular.

5. An elevating device for a seat cushion of a bicycle comprising a bicycle frame, a tightening screw arranged to a frame tube of the bicycle frame, a cylinder having at least one level which is expandable or contractable inside the frame tube, a stick for operating the cylinder, a driving device for driving the stick, and a seat cushion; wherein an adjustable rod of the cylinder is connected to a base arranged to a bottom of the seat cushion; the stick is arranged below the base of the seat cushion; the stick is linked to the driving device; while the driving device is driven, a control key on a top of the cylinder will he pressed by the stick so that the cylinder is controllable to expand or contract; the driving device includes a roller and a pulley; an end of the stick is linked to an axle of the roller; a rope fixed to the roller is leaded to a lever arranged to a handle stem or a predetermined position of the bicycle frame through the pulley; by the lever pulling the rope, the roller will rotate and the stick fixed to the roller will press the control key so as to adjust a height of the seat cushion.

6. The elevating device as claimed in claim 5, wherein the cylinder is slidable out from the frame tube for a predetermined length; and
   the cylinder is covered by a sleeve with a non-circular opening cap is arranged to an upper end of the sleeve.

7. The elevating device as claimed in claim 5, wherein a cross-section of the adjustable rod is circular and the adjustable rod is covered by a non-circular cross-section sleeve.

8. The elevating device as claimed in claim 5, wherein a cross-section of the adjustable rod is non-circular.

* * * * *